(No Model.)
J. S. IRWIN.
ORNAMENTAL GLASS ARTICLE AND METHOD OF MAKING SAME.
No. 502,461. Patented Aug. 1, 1893.
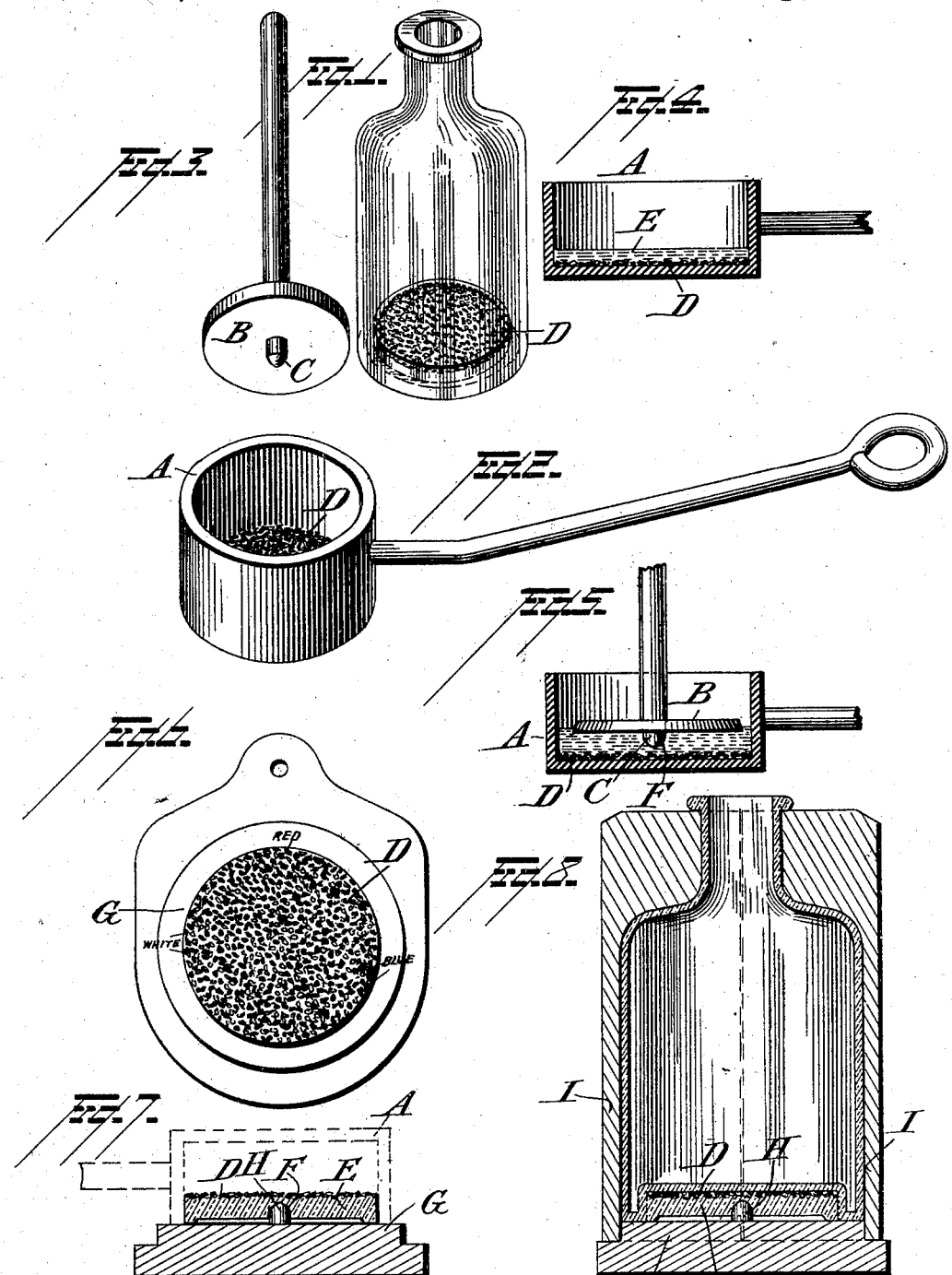

UNITED STATES PATENT OFFICE.

JOHN SAMUEL IRWIN, OF SALTSBURG, PENNSYLVANIA.

ORNAMENTAL GLASS ARTICLE AND METHOD OF MAKING SAME.

SPECIFICATION forming part of Letters Patent No. 502,461, dated August 1, 1893.

Application filed January 14, 1893. Serial No. 458,383. (No model.)

*To all whom it may concern:*

Be it known that I, JOHN SAMUEL IRWIN, a citizen of the United States, residing at Saltsburg, in the county of Indiana and State of Pennsylvania, have invented certain new and useful Improvements in Ornamental Glass Articles and Method and Means of Making the Same; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a method and to means for making articles of glass ware ornamented with variegated colors and to the article made by the method; and it has for its object greater expedition in the manufacture of the article and a reduction in the cost of manufacture and to impart increased strength and consequently durability to the article made.

To the accomplishment of the foregoing and such other objects as may hereinafter appear the invention consists in what is hereinafter described and then particularly specified in the claims, reference being had to the accompanying drawings forming a part hereof.

Figure 1 is a perspective of a bottle made in accordance with the invention. Fig. 2 is a perspective of the cup containing the ornamenting material. Fig. 3 is a perspective of the stamp used. Fig. 4 is a vertical section through the cup showing the ornamenting material with the clear glass on top. Fig. 5 is a similar view showing the stamp in position for amalgamating the two materials. Fig. 6 is a bottom plan view of the base of the mold on which is placed the glass base taken from the cup with the ornamenting material on top. Fig. 7 is a cross section through Fig. 6 showing in dotted lines the cup before it is lifted from the glass base, and Fig. 8 is a vertical section through an ordinary mold in which the main body of the bottle is blown, and showing the bottle and its bottom in vertical section.

In carrying out my invention I take a pan or cup designated by the letter A, preferably made of metal or other suitable material and of dimensions sufficient for the area to be covered by the ornamenting material, and in this pan or cup I place the ornamenting material, preferably glass of variegated colors, pulverized or divided into small particles, the pan or cup preferably being heated so as to keep the material warm for the purpose of effecting a quicker and better cementing or amalgamation of it with the glass that is to compose the article being made. A portion of clear or transparent glass, in its molten state, is next taken from a crucible and placed on top of the ornamenting material in the pan or cup and an amalgamation between the two effected by pressing upon the glass with a stamp B provided with a projection or pin C until the amalgamation is effected when the stamp is withdrawn leaving the ornamenting material D and the clear glass E in the pan or cup amalgamated together and with a depression F in the superposed glass E, the two materials thus united forming the base or portion which will impart the ornamentation to the article to be produced. The next step is to place the base so formed on the bottom of the mold in which the completed article is to be formed. This is done by inverting or turning over the pan or cup so as to bring the clear glass portion of the base with its depression F next to the bottom of the mold designated by the letter G which is formed with a pin or stud H to enter the depression F so as to center the base and hold it in proper position to be united with the glass which will form the body of the article being produced. The transposition of the base in the manner described brings the ornamenting material to the top whereas it was on the bottom before the pan or cup was turned over. The pan or cup is next removed and the body I of the mold properly adjusted on its bottom G. The blower then gathers with his blow pipe a sufficient quantity of clear molten glass from the crucible and manipulates it in the manner ordinarily practiced by bottle blowers and then proceeds to blow it in the way usual in making bottles. This causes the glass thus introduced into the mold to cover the ornamenting material in the bottom of the mold and to become amalgamated therewith thus bringing the ornamenting material between the clear glass applied as previously described and the glass introduced as last described and giving to the bottle a double bottom or bottom of increased thickness with the clear glass and the ornamenting material amalgamated together and imparting a beautiful effect to the bottle as well as increased strength and less liability to be toppled over and broken as the increased quantity of glass in the bottom weights the bottle to that extent. The bottle is finished or completed in the usual way.

I have described for illustration the making of bottles according to my invention but the invention is not confined to that particular application of it as it is adapted for use in making various articles of glass ware, whether the article be made by blowing or pressing but it is especially well adapted to hollow ware glass articles such as bottles, lamp bowls and other articles too numerous to particularly enumerate.

It may be stated that in carrying out the method there will ordinarily be employed a number of the pans or cups containing the ornamental material which will be kept heated so that the temperature of the ornamenting material will be such as to best insure the quick and easy amalgamation of the same with the clear glass employed, and the several steps will be pursued in such succession as to time as will produce the best results under existing conditions.

Having described my invention and set forth its merits, what I claim is—

1. The method herein described of forming ornamented glass articles consisting in placing the ornamenting material upon a suitable base, then placing a clear glass on top of the same and amalgamating said glass and ornamenting material, then inverting the base thus formed so as to bring the ornamenting material on top, and then applying to and amalgamating with said ornamenting material glass to form the body of the article to be produced, substantially as and for the purposes described.

2. The method herein described of forming ornamented glass articles consisting in placing the ornamenting material upon a suitable support, then applying a clear glass to said material and pressing the same with a stamp having a pin or projection to amalgamate the material and glass and form a depression in the glass, then inverting the base thus formed to bring the ornamenting material on top and the depression in the opposite face over a pin or stud on the bottom of a mold so as to center the base formed as specified, and then applying to and amalgamating with the ornamenting material the glass which is to form the body of the article, substantially as and for the purposes described.

3. A hollow article of glass ware formed with a double bottom or base composed of a lower and an upper surface of glass with an ornamenting material interposed between the surfaces and amalgamated with both, substantially as and for the purposes described.

In testimony whereof I affix my signature in presence of two witnesses.

JOHN SAMUEL IRWIN.

Witnesses:
AUGUSTE HAUTZ,
ALVA R. MCQUESTON.